May 11, 1937. P. DA VALLE 2,080,167
APPARATUS FOR THE DISTILLATION OF ALCOHOL
Original Filed March 28, 1934  4 Sheets-Sheet 1

INVENTOR.
PETER DAVALLE
BY
James M. Abbott
ATTORNEY.

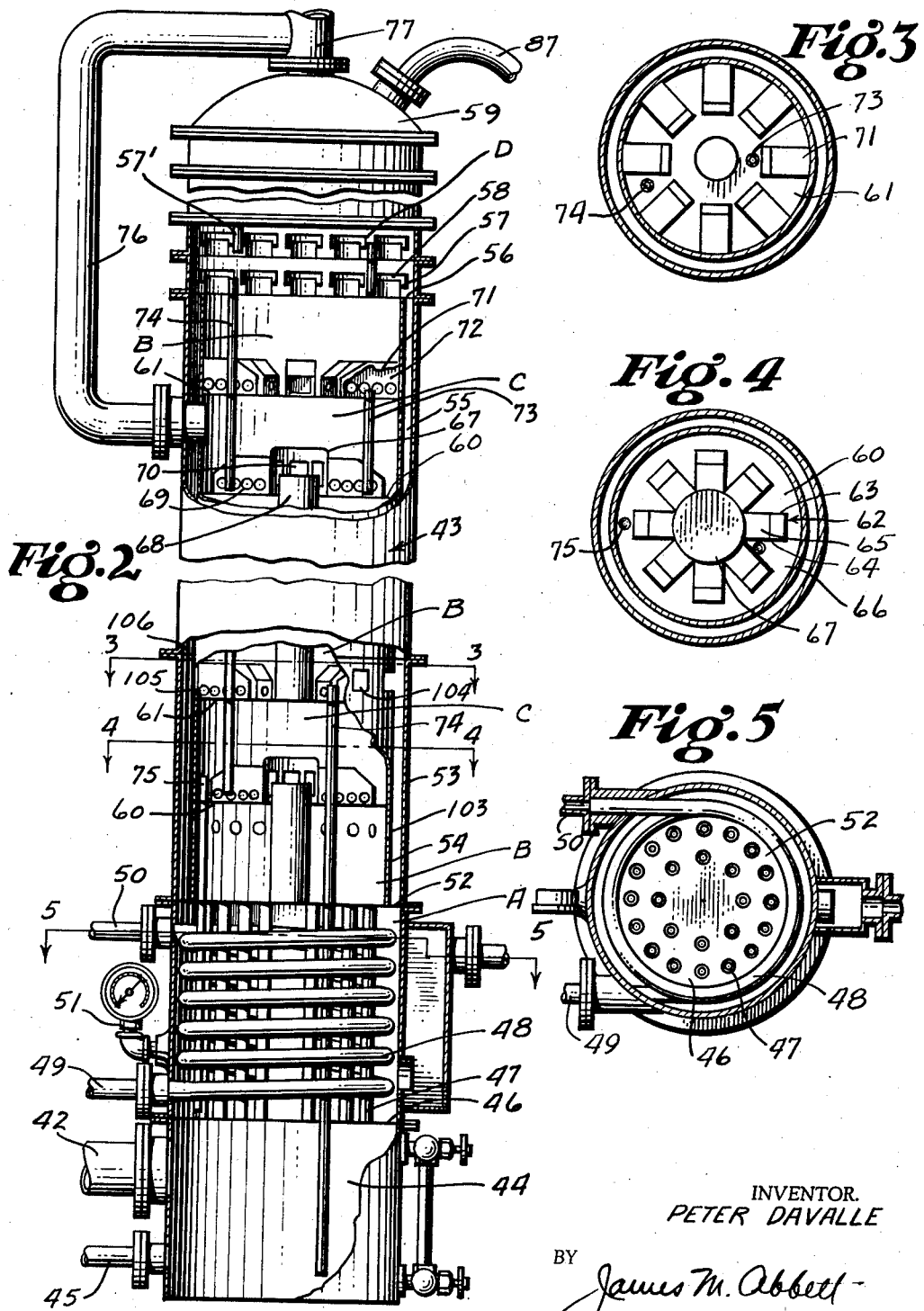

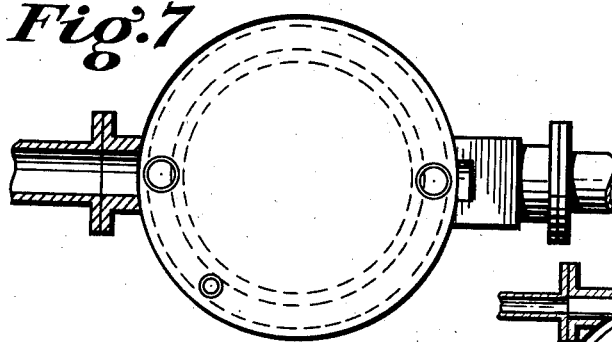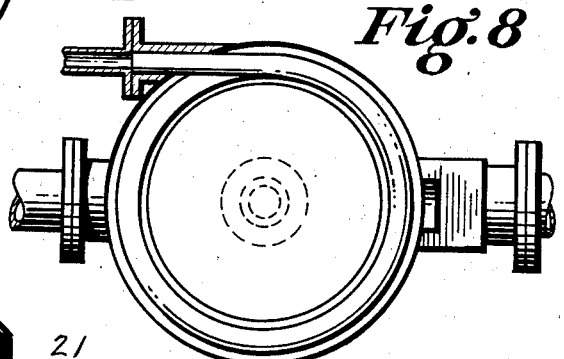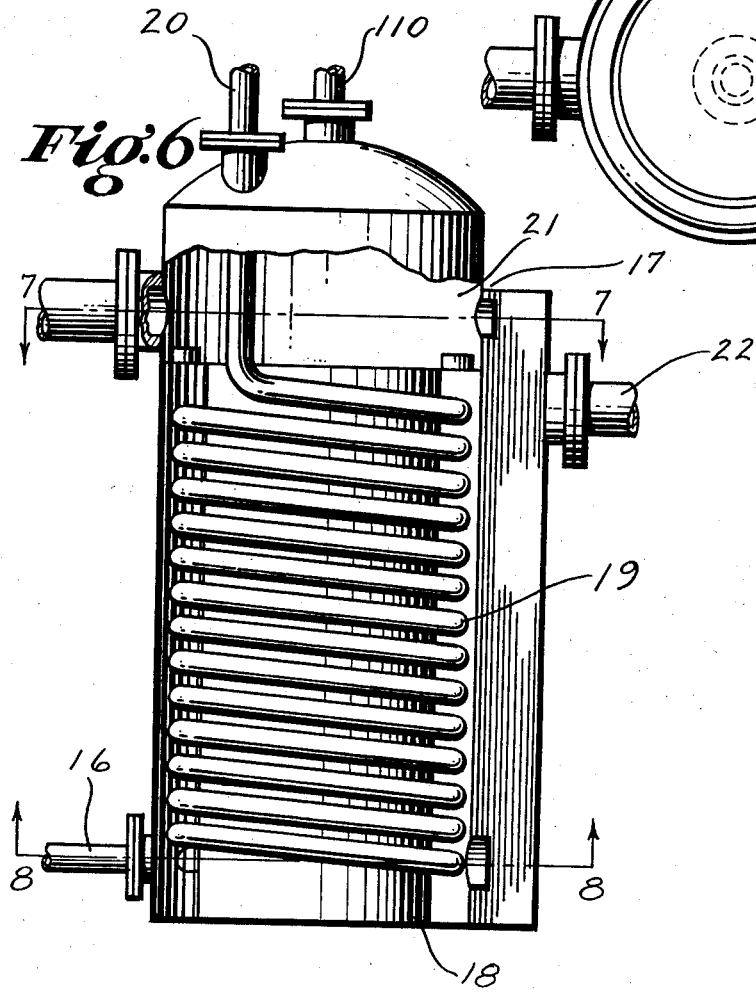

Patented May 11, 1937

2,080,167

UNITED STATES PATENT OFFICE 2,080,167

APPARATUS FOR THE DISTILLATION OF ALCOHOL

Peter Da Valle, South Gate, Calif.

Application March 28, 1934, Serial No. 717,728
Renewed September 26, 1936

2 Claims. (Cl. 202—158)

This invention relates to the distillation of products to obtain their desirable alcoholic constituents, and the invention is particularly concerned with a method and means for the distillation of alcohol.

In the usual method of obtaining alcohol by distillation considerable difficulty is experienced in separating the aldehydes, acids, esters, and furfurol from the product desired, thus requiring redistillation not only in order to obtain a liquid having a desired high alcoholic content, but also for removing impurities which would otherwise contaminate the finished product. It is common practice in providing apparatus for the distillation of alcohol to pass the product being treated through a series of stills, thus requiring a large amount of equipment, as well as making it necessary to supply a great amount of heat to which the product is subjected as it flows through the apparatus, and it is the principal object of the present invention to provide apparatus of the class described capable of being operated by a novel method whereby a counterflow of the product being treated may be passed through a single unit of the apparatus during which time there will be a suitable distillation and heat exchange requiring a minimum amount of heat for the operation and at the same time assuring that the undesirable constituents of the product being treated will be efficiently removed.

The present invention contemplates the provision of a distillation apparatus which includes a bubble still of novel construction through which distillation products in liquid and vapor phase may be passed in parallel and counterflow, and other novel apparatus for treating liquids and for separating desirable constituents therefrom.

The invention is illustrated by way of example in the accompanying drawings in which:—

Fig. 2 is an enlarged view in vertical section and elevation showing the bubble column having novel features of the invention.

Fig. 3 is a view in transverse section through the bubble still and particularly showing one of the bubble still plates, as seen on the line 3—3 of Fig. 2.

Fig. 4 is a view in transverse section showing one of the bubble still plates as seen on the line 4—4 of Fig. 2.

Fig. 5 is a view in transverse section showing the heater unit of the bubble still as seen on the line 5—5 of Fig. 2.

Fig. 6 is a view in vertical section and elevation showing a novel type of preheater forming a part of the present apparatus.

Fig. 7 is a view in transverse section through the preheater as seen on the line 7—7 of Fig. 6, and viewed in a downwardly direction.

Fig. 8 is a view in transverse section through the preheater as seen on the line 8—8 of Fig. 6, and viewed in an upwardly direction.

Figure 1:
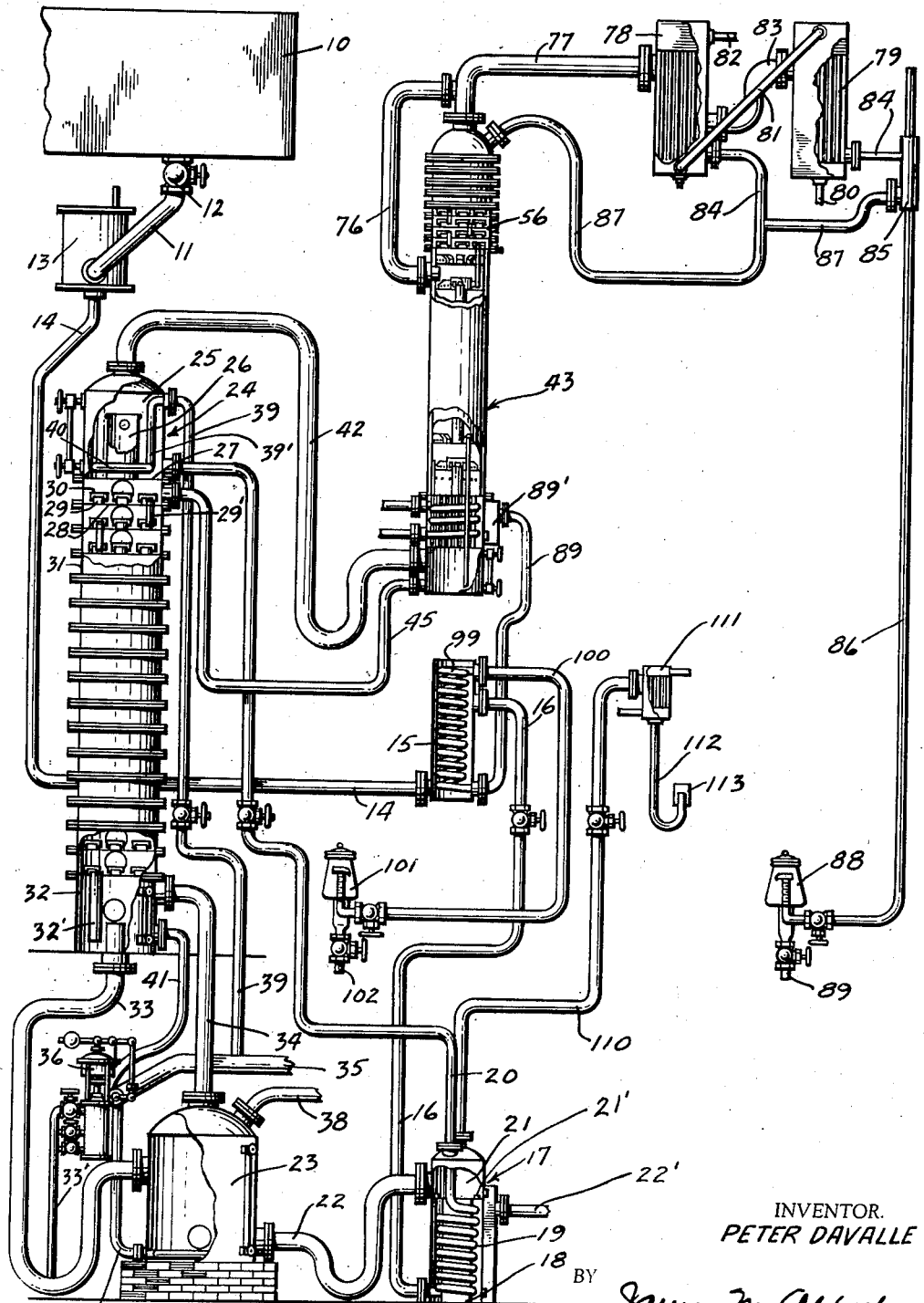
Figure 1 is a view in diagram showing the apparatus with which the present invention is concerned.

Referring more particularly to the drawings, 10 indicates the storage tank within which a quantity of fermented liquid is placed. This liquid may be delivered to the storage tank by gravity or by pumping apparatus. A draw-off pipe 11 is connected with the tank to receive the gravity flow of liquid therefrom as regulated by a valve 12. The drawing-off pipe communicates with a volume regulator 13 by which the liquid is automatically regulated as to volume so as it passes through pipe 14 it will have a uniform flow. The pipe 14 communicates with a heat exchanger 15 in which the high wine from an aldehyde column is cooled. The temperature of the fermented liquid or wash in the tank 10 is substantially room temperature, but when it passes through the heat exhanger 15 it is raised to a temperature of the order of 80° F. The liquid delivered to the heat exchanger 15 by pipe 14 enters the lower end thereof and is withdrawn therefrom at a point adjacent the upper end through a pipe 16. The pipe 16 leads to the lower end of a preheater 17. This preheater is of novel construction and is shown in detail in Figs. 6, 7, and 8 of the drawings. The preheater is formed with a central tubular core 18 around which a coil 19 passes. The coil 19 is connected at its lower end with the pipe 16 and at its upper end with a pipe 20. The core is formed with a head 21 which is connected by U-pipe 22 with a vaporizer 23. The vaporizer is of a temperature of the order of 212° F. The pipe 22 conducts the fluid from the vaporizer to the head 21 of the preheater 17 after which the fluid may pass down around the coil 19 through openings 21', and raises the temperature of the fermented liquid in the coil 19 to the temperature of the order of 170° F. The spent wash from pipe 22 then passes to the sewer through pipe 22'. The fermented liquid then passes from coil 19 through the pipe 20 to the top of the bubble column 24. This liquid is directly introduced into a dome 25 where it may accumulate to the overflow level of a central pipe 26. This pipe is mounted upon a transverse plate 27 and communicates with an opening directly through the center thereof. The liquid overflowing then successively flows on to a series of bubble trays 28, each of which is formed with a plurality of central pipes 29 over which bubble caps 30 of the barbette type are disposed in spaced relation thereto. It will be understood that the liquid accumulating on the trays will finally overflow the upper lip of each of the overflow tubes 29' and will then flow downwardly on to the next tray and will be in intimate contact with vapors passing upwardly through the bubble column. The outer shell 31 of the bubble column is preferably made in sections so that the sections may be bolted together to provide a composite cylindrical outer wall for the bubble column. The liquid which reaches a sump 32 of the bubble column 24 is drawn off through a draw pipe 33 which leads to the vaporizer 23, and thereafter passes from the vaporizer through the pipe 22. A table 32' draws off the liquid from the lowermost bubble tray and leads it into the sump 32. Vapors carrying certain fractions of the products pass upwardly from the vaporizer through pipe 34 and into the sump 32 of the bubble still 24 at a point beneath the lower bubble tray. Live steam is delivered to the vaporizer through a pipe 35 which leads through a pressure regulator 36 and then is conducted to the bottom of the vaporizer through a pipe 37. The exhaust steam from the vaporizer escapes through a pipe 38. A steam pipe 39 also connects with the pipe 35 and leads to the dome of the bubble still 24. At the top of the dome the pipe 39 communicates with a downwardly extending pipe 39' carrying a jet ring 40. This ring circumscribes the overflow pipe 26 and is formed with openings in its inner circumference so that while the ring is submerged beneath the accumulated body of fermented liquid in the dome live steam will be projected inwardly and radially through the body of liquid to heat and tend to vaporize the same.

Figure 9:
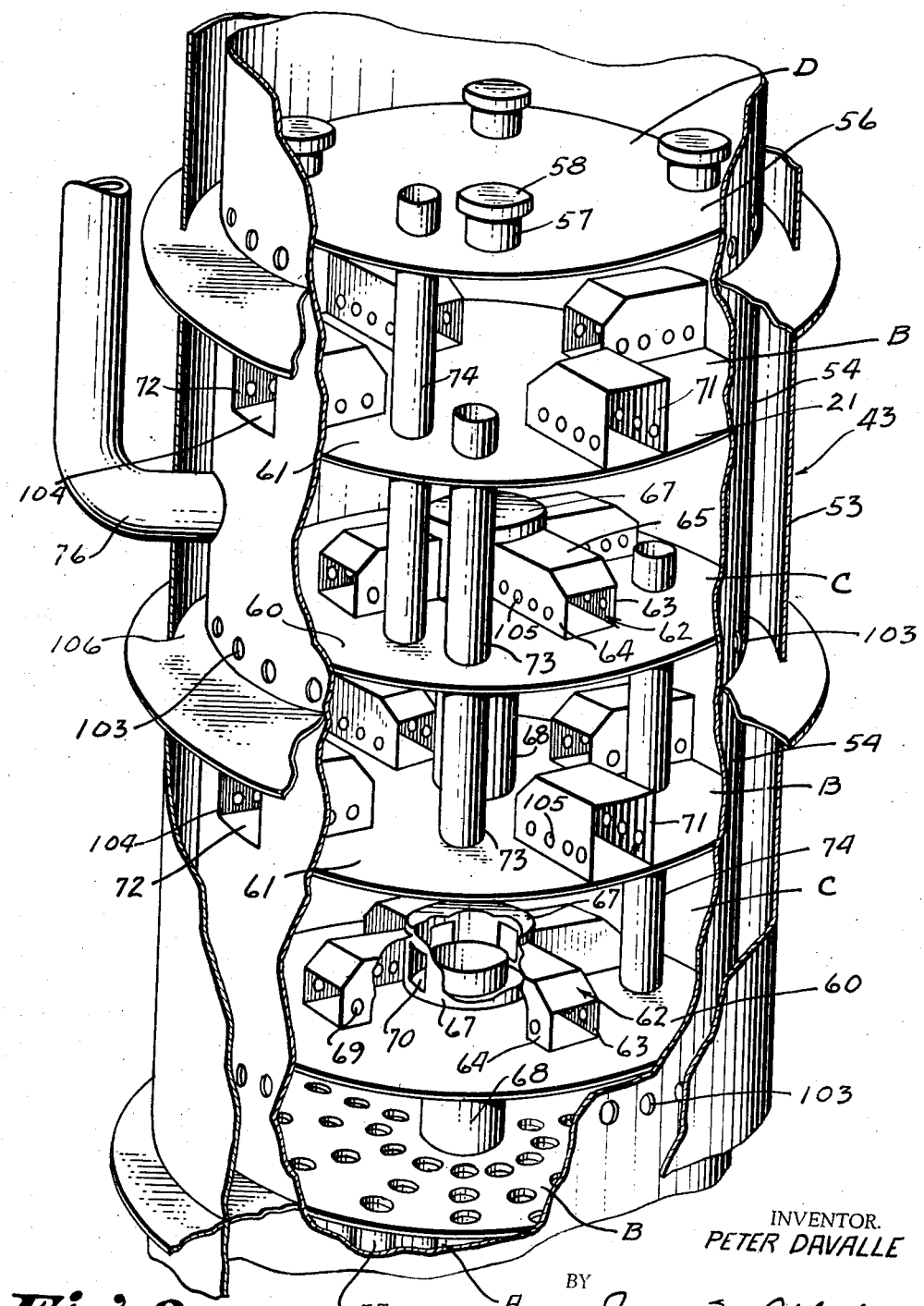
Fig. 9 is an enlarged view in section and perspective showing the bubble trays of the aldehyde column.

The sump is in effect a reboiler since the heavy residuum which accumulates at the bottom of the column may be acted upon by steam delivered to the bottom of the sump 32 through a pipe 41. The vapors passing upwardly through the bubble column 24 and comprising live steam from the pipe 41, and vapor from the vaporizer 23 flowing through pipe 34 will after passing upwardly through the column be drawn off through the pipe 42 to the aldehyde column 43. This column is of substantial construction and is one of the important elements of the present invention. The pipe 42 communicates with a compartment 44 at the bottom of the column 43. Liquid from the aldehyde column 43 is conducted to the compartment above the upper tray 28 of the columns 24 through a pipe 45. The vapors then pass upwardly through a tube sheet 46 and into a nest of tubes 47. These tubes are longitudinally aligned with the column 43. Previous to the delivery of the vapors from the bubble column 24 they have attained a temperature in the order of 185° F. Liquid drawn from the lower bubble tray 60 through pipe 75 also tends to increase the degree of heat within a compartment A. As the vapors pass upwardly through the nest of tubes 47 the temperature of the vapors is raised further due to the fact that a helical coil of pipe 48 surrounds the tubes communicating with a steam inlet pipe 49 at its lower end and an exhaust pipe 50 at its upper end, and is submerged in the liquid delivered through pipe 75. The gauge 51 indicates the pressure within the column. A tube sheet 52 separates the main length of the shell 53 from the portion containing the tube nest 47 and permits the vapor from the tubes 47 to pass upwardly into a center cylindrical shell 54 of the aldehyde column. The center shell 54 extends upwardly through the outer shell 53 and is spaced with relation thereto to form annular passageways 55 for a purpose to be hereinafter set forth. These passageways are separated by partition plates 106. The upper end of the center shell 54 is closed by a bubble tray 56. This tray also forms a partition across the entire column and since it is formed with the usual bubble tubes 57 and caps 58 vapor may pass upwardly through the column and from the inner shell 54 as it flows to the dome 59 of the column 43. The plurality of bubble trays 60 and 61 are disposed in superposed alternate spaced relation to each other within the shell 54 to form separate compartments B and C. As shown in Figs. 2, 4, and 9, the bubble trays 60 are provided with radial cups 62 having spaced vertical side walls 63 and 64 and a top plate 65, while the side wall plates are secured to the circular bubble plate 66 forming a part of the bubble tray unit 60. The side walls 63 and 64 abut at their inner ends against the circular wall of center dome 67 which is closed over at its upper end, but which is positioned over the upwardly projecting portion of a center vapor tube 68 one of which passes through each of the series of compartments B. Perforations are formed through the circular wall of the center dome 67 to permit the vapors to flow from the radial bubble caps 62 into the center dome 67. The height to which liquid may accumulate on the bubble plate of the tray unit 60 is determined by the position of an overflow pipe 75. The bubble tray units 61 are formed with a plurality of radial bubble caps 71 which are substantially identical with those previously described and indicated by the numeral 62, save that they are closed at their inner ends and communicate with outlet passageways 72 through the wall of the shell 54 and into the passageway 55 which occurs between the inner and outer shells of the aldehyde column. Overflow pipes 73 extend downwardly from bubble plates 61 to bubble plates 60. These pipes are opened at their top and will control the level of the liquid accumulating on the plates 61 due to the amount of extension of the pipe above the level of the plate. These pipes occur between radial bubble caps 62 and 71 as shown in Figs. 3, 4, and 9 of the drawings. The lower ends of these pipes terminate a short distance above the face of the bubble plates 60 and are submerged in the accumulated volume of liquid occurring upon the face of this plate. In this manner upward flow of vapor through the tubes 73 is prevented. Drain pipes from the lowermost bubble plate of each of the sets of bubble units 60 and 61 are provided as shown at 74 and 75. This will permit the final accumulation of liquid upon tray 61 to pass into the bottom compartment 44, and the final accumulation on tray 60 to pass into compartment A. The compartment C between the two uppermost bubble trays 60 and 61 is in communication with a bypass pipe 76 which in turn communicates with the main vapor draw-off pipe 77.

The draw-off pipe 77 connects directly with the dome 59 of the aldehyde column 43 and leads to a dephlegmator 78 and then to one end of a final condenser 79. A counter flow of cooling water enters the final condenser through pipe 80 and then passes to the dephlegmator 78 through pipe 81. The water is then drawn off through pipe 82. The vapors from the dephlegmator are led through a pipe 83 to the condenser. The condensate is drawn from the dephlegmator through a pipe 84 and from the condenser through a pipe 84'. The pipe 84 leads directly to the dome 59 of the aldehyde column so that the condensate may flow successively downwardly on to and through the bubble trays 56, a set of which trays is interposed in compartment D between the dome 59 and the lowermost tray 52.

The condensate which is led off from the condenser through the pipe 84' passes through an overflow regulator 85 where substantially five per cent of the condensate is drawn off for test through the pipe 86, and the remaining ninety-five per cent is introduced into the pipe 83 by flowing along a pipe 87. The relatively small proportion drawn off through pipe 86 is conducted to an aldehyde test glass 88 from which it may then pass to a draw-off pipe 89.

Fractions of the condensate which eventually reach the compartment A of the aldehyde column 43 after having passed therethrough, are finally drawn off through a pipe 89 connecting with a trap 89' by which the liquid level in compartment A is maintained substantially constant. This liquid was drawn from the lowermost tray 61. This liquid will usually consist of hot water and a small percentage of alcohol and is carried through pipe 45 to upper tray of the bubble column 24 where it is subjected to a new evaporation. The liquid entering compartment 44 may be roughly divided into two classes, to-wit; head and tail products. The still is more particularly concerned with the head products of the aldehyde class, and tail products of the amyl alcohol class. These pass through concentrations from class one to class two. The present method and invention is concerned particularly with the products in class two. A coil 99 of cooler 16 connects with pipe 89. The upper end of this coil is connected with a pipe 100 leading to a high wine take-off 101 which is fitted with a pipe 102 by which the product may be connected to a suitable rectifying apparatus where the amyl alcohol is removed. The present invention is not concerned with that apparatus.

In addition to the pipes previously described as in communication with the preheater 17, as shown in Fig. 1 of the drawings, a pipe 110 is provided which communicates with a condenser 111 having a final recovery pipe 112 and a trap 113. The fumes from compartment 21 of the preheater 17 are carried over into the condenser 111 from which they are led to the trap 113 and may be tested to ascertain whether or not an excess of alcohol is being lost. Suitable valves may be interposed in the various conduits of the apparatus, such for example as those shown in the drawings, without effecting the principle of the invention, since it will be obvious that the regulation of the flow of fluids through the different parts of the apparatus must be adjusted to agree with the capacity and performance of the different pieces of equipment.

In the operation of the present invention the fermentation wash to be treated is placed in the storage tank 10 by any suitable delivery mechanism after which it may flow downwardly by gravity through the pipe 11 as regulated by the valve 12. The volume regulator 13 will then control the flow of the fermentation liquid downwardly through the pipe 14 and to the bottom of the heat exchanger 15. The fermentation liquid in the tank is usually at room temperature and as it passes upwardly through the heat exchanger its temperature will be raised in an exchange of heat from the liquid which passes through the coil 99 on its way from the aldehyde column to the preheater. The temperature of the liquid flowing through the pipe 14 to the heat exchanger 15 will be raised to approximately 100° after which the liquid will pass along pipe 16 to the preheater coil 19 of the preheater 17. While within this preheater the temperature of the fermentation liquid will be raised to approximately 170°. This is brought about by the heat of the fluid passing into the compartment 21 of the preheater and then through openings 21' to surround the coil 19. This spent fluid will pass out through pipe 22'.

The liquid from the coil 19 will then flow through pipe 20 to the dome 25 at the top of the bubble still 24. The liquid will accumulate within its compartment and above the level of the partition plate 27 until it overflows the center pipe 26. There will be a considerable body of this liquid thus accumulated and it is desirable to raise its temperature before subjecting it to the action of the vapors passing upwardly through the bubble still. This is done by projecting jets of steam into the body of liquid preferably from jet openings extending inwardly and radially from the steam ring 40. When the liquid overflows the upper lip of the center tube 26 it will fall upon the uppermost bubble tray 28 and will, after accumulating thereon to a desired depth, overflow the tray passing downwardly through the tubes 29'. This liquid which accumulates on trays 28 will have intimate contact with the upwardly flowing vapors and the steam introduced into the bubble still below the lowermost bubble column. It will be understood of course that as the vapors and steam rise within the column they pass through the bubble tubes of the trays progressively so that varying conditions of partial fluid pressure will prevail through the height of the bubble column and so that various constituents of the fermentation liquid will be liberated and will pass off as vapor when a characteristic zone of temperature, and partial pressure is reached in the downward flow of the liquid.

The vapor liberated from the liquid in the bubble still 24 will be drawn off through the pipe 42 connected with the dome 25, while the heavy liquid constituents of the fermentation liquid will pass into the reboiler compartment or sump 32 at the bottom of the column 24. This will insure direct action of steam upon it since the pipe 41 conducts steam into this compartment tending to produce evaporation of the accumulated liquid. The liquid is then drawn from the bottom of bubble still 24 and led to the vaporizer 23. Certain vapors are then refed to the bottom of the still 24 through pipe 34. These vapors are obtained from a vaporization action in the vaporizer 23 where residue liquids are led through a pipe 33 and are acted upon by live steam introduced through a pipe 37. The spent liquid which remains in the vaporizer 23 is carried to the preheater 17 and there utilized as a heating fluid to raise the temperature of the fermentation liquid which is introduced into the bubble column 24 through the pipe 20.

The final vapor product which passes over from the bubble column 24 to the aldehyde column 43 will be for the most part water vapors, ethyl alcohol, mixed with certain volatile products of fermentation. These are introduced directly into the bottom of the aldehyde column and will be at a temperature of the order of 185° F. The vapors then pass upwardly through the nest of tubes 47 in compartment A while they are being heated by the steam heating coil 48 which circumscribes them, and by the liquid which drains into the lower compartment C through pipe 74. These vapors are then introduced into the lowermost compartment B of the aldehyde column as defined by the tube sheet 52, the bubble tray 60 and the circumscribing inner shell 54. These vapors will be projected directly against the underface of the bubble tray 60 and due to the fact that this plate is quite hot will cause the vapors impinging thereagainst to be vaporized into lighter fractions, after which these vapors will pass outwardly through openings 103 and upwardly to openings 104 in the side wall of the shell where the vapors will be diverted inwardly into the radial bubble caps 71 and into a compartment. The vapors will then pass over the surface of the impounded liquid which has accumulated upon the bubble tray 61 of this particular compartment and will then pass outwardly through openings 105 in the side walls of the bubble caps 71. It is to be understood that a circumscribing partition member 106 occurs between the outer shell 53 and the inner shell 54 at a point above each set of openings 104 so that the vapors will be prevented from flowing directly to the top of the aldehyde column without interruption. These vapors which are formed in the compartments B will then pass upwardly within the compartment to encounter the next succeeding bubble tray 60 where they will flow around the center tube 68 and into the center dome 67 from which they will thereafter pass to the radial bubble domes 62 of the bubble tray 60 and then outwardly through the openings 69 in the side walls 63 and 64 thereof.

The sequence of flow will thereafter continue as previously described, for the vapors will pass upwardly striking the undersurface of the heated bubble tray 61 which is superposed above the tray 60, after which the vapors will be directed outwardly through another set of openings 103 formed in the side of the inner shell 54. This operation will be completed through alternate bubble trays 60 and 61 until the set of trays 56 is encountered adjacent the dome of the aldehyde column when the vapors will pass successively through said trays in the customary manner. At this point the alcohol vapors rapidly concentrate, since the vapors passing through cups 58 on trap 56 will condense, forming a new vapor. The alcohol content at the top of column 53 is approximately 73 per cent by weight. This is approximately the point at which amyl alcohol (class 2) collects. This comprises iso amyl acetate, iso butyl alcohol and propyl alcohol. These undesirable alcohols may be drawn off from the dome 59, or they may be allowed to pass over to the dephlegmator 78 and condenser 79 to be collected at the test glass 88. By this last named method various impurities are collected including those of the aldehyde class and the amyl alcohol class.

During the entire fractionation as represented by the up flow of vapors through aldehyde columns 53 from its lower section A to the dome 59, the evaporation causes the lightest impurities of the aldehyde class to be driven toward the dome 59. At this point, however, there still remains some lesser impurities of the aldehyde class which are readily and efficiently removed during the return flow of the product from the cooler 79 and downwardly through the aldehyde column 53 in the reflow slip of the process to be hereinafter described.

A recirculation of these vapors in dome 59 may be brought about through the pipe 76 connecting the dome to the compartment between the uppermost pair of bubble trays 60 and 61. Vapors from the dome 59 are finally drawn off through the pipe 77 and are then conducted to the dephlegmator 78 where they are partially condensed. The uncondensed vapors are then delivered through the pipe 83 to the final condenser 80, after which a desired major proportion of the condensate is returned to the dome 49 of the aldehyde column through pipe 87.

The reflow of condensate from the cooler 79 through pipe 87 is now subject to a revaporization and distillation through the aldehyde column 53 through which it had been previously passed as described. This method of procedure provides a material conservation of heat and at the same time insures that the undesirable constituents of the fermentation liquid may be effectively and efficiently removed before there is an opportunity for it to contaminate the high proof alcohol. The concentrated liquid delivered is to the dome 59 through the pipe 87 and will flow downwardly upon and through the successive bubble plates 56 which are disposed at the top of the aldehyde column and adjacent the dome. This liquid is then subjected to the action of the vapors passing off from the aldehyde column at a higher temperature than that of the liquid, since the liquid is being drawn from the cooler 79. The result will be further vaporization of the liquid as it flows downwardly through the bubble plate 56 and the tubes 57' and then through tube 74 to accumulate on the uppermost bubble tray 60. This accumulation of liquid will be regulated by the pipes 74 which extend from a desired level above tray 56 down through the bubble tray 61 and terminate adjacent to the upper face of the next subjacent bubble tray 60. The liquid will accumulate on this tray until it has reached a level so that it can overflow the pipe 73. The liquid will then be in compartment C where it will be heated by the vapors entering it through center cap 67 and the bubble domes 62. The vapors which rise from this compartment consist of high alcohols which tend to accumulate at the top of the still and are led by by-pass 76 to the pipe 77 above the dome. The distillate will continue to flow from one plate 60 to another through pipes 74 until it is finally drawn off through pipe 75 and led into the compartment A. The alcohol which reaches this compartment is light in strength due to the vaporization which has taken place during the downward flow of the liquid. The impurities of the aldehyde class will have been for the most part extracted from the remaining liquid so that the liquid will comprise water and a relatively large percentage of amyl alcohol which may later be recovered by redistillation. This liquid will fill compartment A and will submerge the tubes 46 and the coil 48. The heat supplied to the coil 48 will maintain a uniform temperature in compartment A during operation. It is also of advantage in restarting the apparatus. The final condensed product in compartment A is then led from the bottom of the aldehyde column to the heat exchanger 15 where it will come into heat exchange relationship with the fermentation liquid being delivered to the bubble still for the first time. The condensation after passing through the cooler will then pass to the high wine take-off 101, after which it may be rectified to remove the fusel oil in any suitable rectifying apparatus.

It will thus be seen that the apparatus here disclosed provides suitable means for efficiently distilling fermentation liquids to a high degree of purity by the use of a minimum amount of a heating medium such as steam, and a minimum amount of equipment, whereby a final product may be obtained which is particularly adapted for subsequent steps of rectification.

It is obvious that various changes and modifications may be made in the details of construction and the design of the above specifically described embodiment of the apparatus of this invention without departing from the spirit thereof, and the particular embodiment of the method of the present invention is not limited nor dependent upon the use of the particular apparatus described herein, nor is it limited to the particular details of the preferred method, but both method and apparatus of the present invention include all such changes, modifications, substitutions, and equivalents as come within the scope of the following appended claims.

Having thus described my invention, what I claim and desire to secure by Letters Patent is:—

1. A bubble still comprising an outer shell, an inner shell spaced therefrom, a set of bubble trays disposed within the inner shell in spaced relation to each other, said trays having a plurality of radial bubble caps in communication with a central dome and being formed with openings in their side walls to permit the accumulated liquid on the floor of the tray to flow into the radial bubble caps, openings being formed in the side wall in the inner shell at a point beneath each of said trays to permit vapor to flow outwardly in the space between the two shells, a second set of bubble trays, one of which is interposed between each pair of trays of the first set, said second set of bubble trays being formed by the plurality of radially disposed bubble caps, said caps having openings in their side walls through which liquid impounded on the bubble trays may flow, the wall of the inner shell being formed with openings communicating with said bubble caps, a set of pipes extending downwardly through each of said last named bubble trays from a point above the level of a tray to a point adjacent the upper face of a subjacent first named bubble tray, a center pipe, one extending downwardly from each of said first named trays from a point above the level of the tray within the center dome to a point adjacent the next lower tray, and means forming partitions between the inner and the outer shells in a horizontal plane between sets of openings in the side wall thereof.

2. A distillation apparatus comprising a vapor heating compartment at the bottom thereof, a central shell, an outer shell circumscribing the same, a series of superposed spaced bubble trays mounted within the central shell, openings through the side wall of the shell whereby vapor from beneath one of said bubble trays may pass outwardly into the space between the two shells and then re-enter the center shell at a point above the next succeeding bubble tray, bubble caps upon said next succeeding tray and through which the vapors flow as they pass into said central shell, means permitting upward flow of said fluid through the next succeeding bubble tray and then outwardly into the compartment thereabove, a bubble column unit disposed at the top of said shell and into which the final vapors flow, condensing apparatus through which said vapors flow and within which they are reduced to liquid phase after which the liquid is returned to the top of said distillation apparatus, means for thereafter permitting said liquid to accumulate to a desired depth on the successive bubble trays and to thereby intimately contact the vapors flowing upwardly through the apparatus.

PETER DA VALLE.